3,032,527
CURABLE EPOXIDE COMPOSITION CONTAINING POLYHYDRIC PHENOL AND CURED PRODUCT THEREOF
Sylvan Owen Greenlee, 343 Laurel Drive, West Lafayette, Ind.
No Drawing. Filed Aug. 29, 1958, Ser. No. 757,946
16 Claims. (Cl. 260—43)

This invention relates to resinous epoxides and, more particularly, relates to curable mixtures of resinous polyhydric phenols and polyepoxides and the cured products thereof.

In the production of infusible, insoluble products by reaction of polyhydric phenols with epoxides, it is essential that the two reactants be miscible one with the other in order to produce end products having the desired physical and chemical characteristics. Moreover, it is desirable that curable mixtures of polyhydric phenols and epoxides be characterized by stability when maintained for long periods of time at ambient temperatures. However, the polyhydric phenol-epoxide mixture should then readily be convertible to the desired infusible, insoluble end product by heating for a short period of time, for example, for a half an hour, at temperatures in the neighborhood of 150° C.

Despite the great activity in the epoxy resin field in recent years, the polyhydric phenols employed for reaction with epoxides to form infusible, insoluble products have not been entirely satisfactory. Difficulty has been experienced in obtaining the necessary miscibility with commercially available epoxides requisite to production of the desired characteristics in the end product. Additional difficulty has been encountered in producing polyhydric phenols containing sufficient active phenolic hydrogens per molecule to effect the desired reactivity in curing operations. Further, cured epoxy compositions formed by reaction of epoxides with currently available polyhydric phenols do not possess the flexibility requisite to some applications in which other characteristics of the epoxides are attractive.

One group of polyhydric phenols currently reacted with polyepoxides are the phenol-formaldehyde condensates. The phenol-formaldehyde condensates have exhibited several rather serious deficiencies such as the liberation of formaldehyde and water of condensation during the curing operation. Moreover, the activity of the phenolic hydroxyl of phenol-formaldehyde condensates is materially lower than that of the phenolic hydroxyl of phenols which have not been condensed with formaldehyde. The phenol-formaldehyde condensates are further deficient in that it is almost impossible to control the number of phenolic hydroxyl groups present per molecule. Moreover, phenol-formaldehyde condensates exhibit the undesirable tendency to condense with themselves prior to reacting with polyepoxides to form the desired end products.

Other polyhydric phenols employed in reaction with polyepoxides have been the reaction products of dialdehydes with phenol such as the tetrahydric phenols described in U.S. Patent 2,806,016. Trihydric phenols have also been prepared by the reaction of phenol with unsaturated aldehydes such as acrolein as disclosed in U.S. Patent 2,801,989. However, these polyhydric phenols also are lacking in the desired characteristics above described, viz., miscibility with epoxy resins, presence of the desired amount of reactive phenolic hydrogens, and flexibilizing action on the cured product. Moreover, such polyhydric phenols have also exhibited a tendency in their purer form to crystallize, thus imparting non-homogeneity to the formulated product.

In the past, attempts have been made to introduce the desired flexibility into cured epoxy compositions by incorporating in the polyhydric phenols sufficient long-chain aliphatic structure. For example, U.S. Patent 2,665,266 describes a long-chain dihydric phenol prepared by condensation by alkenyl phenol with phenol. These products, however, are limited to two active phenolic hydroxyl groups per molecule, this number being insufficient to lend desired reactivity either with commercially available aromatic or aliphatic-type epoxy resins. Accordingly, desired film toughness is not obtained, particularly in compositions containing predominantly aliphatic structures.

Another prior art expedient employed in an effort to flexibilize the polymerization products of polyepoxides with polyhydric phenols has been the incorporation into the composition of a plasticizer which does not stiochiometrically react with the epoxide compositions. Plasticizers which have been used for this purpose include dibutyl phthalate, sulfonamide plasticizers, polysulfide resins known commercially as Thiokol resins, and polyamide resins. The latter two materials, in particular, are known to react to some extent with the epoxide compositions; however, their reactivity is not a definite stiochiometric reaction such that all ingredients are uniformly bound together molecularly. Another weakness of the commercial polysulfide and polyamide-type plasticizers is that of depreciating the good electrical properties of epoxy resins, particularly at the higher temperatures. It has been demonstrated, however, that the presence of ester and ether linkages in these epoxy resin structures is not appreciably detrimental to the electrical properties. In using known plasticizing materials, the formulator is also limited to choosing epoxide resins which are sufficiently compatible with the plasticizers so that phase separation does not occur either during application or during conversion of the mixture. In choosing the ingredients based on miscibility, therefore, the formulator is often confronted with the choice of a combination of ingredients which are far removed from a combination which would give optimum conversion characteristics and optimum properties.

In view of these and other difficulties experienced by the art, it is an object of the invention to prepare stable, readily curable mixtures of polyepoxides and resinous polyhydric phenols having at least four highly reactive phenolic hydroxyls.

It is an additional object of the invention to prepare stable, partially reacted mixtures and intermediate reaction products of polyepoxides and resinous polyhydric phenols having at least four phenolic hydroxyls, which mixtures are suitable for the formation of infusible, insoluble products on subsequent application of heat.

Another object of the invention is a cured polyepoxide resin of enhanced flexibility.

Yet another object of the invention is an infusible, insoluble epoxide material characterized by enhanced resistance to chemical attack.

A further object of the invention is an insoluble, infusible cured epoxy resinous material containing a chemically bound flexibilizing plasticizer.

Another object of the invention is a heat-curable mixture containing a polyepoxide and a flexibilizing resinous polyhydric phenol, said mixture being highly stable at ambient conditions but quickly convertible to the infusible, insoluble state on heating to a temperature of about 150° C.

Additional objects will appear from the following detailed description of the invention.

It has now been found that resinous polyhydric phenols having at least four reactive phenolic hydroxyl groups, prepared by the reaction of alcoholic diphenols (hereinafter referred to as ADP's) with polybasic acids or polybasic acid anhydrides under conditions which esterify the alcoholic content of the ADP's leaving the phenolic hydroxyl groups essentially in an unreacted, highly active state may be admixed with and/or reacted with polyepoxides (epoxies having an average number of epoxy groups greater than 1) to accomplish the desired objects. It has been found that the polyepoxides and the resinous polyhydric phenols are completely miscible with each other so that mixtures may be prepared in essentially the non-reacted state either with or without an added solvent. It has also been found that the polyepoxides and the resinous polyhydric phenols may be partially reacted to give intermediate reaction products which are still fusible and are still soluble in organic solvents and may be further treated with heat to give infusible, insoluble products.

The ADP's contemplated by the present invention are characterized by the following structural formula:

$$X-A-X$$

in which X is the residue of a polyhydric phenol and A is the residue of an alcoholic hydroxyl-containing molecule containing from 1 to 3 alcoholic hydroxyl groups. The polyhydric phenols preferably are dihydric phenols or mixtures of dihydric phenols with amounts of higher polyhydric phenols below that causing substantial gel formation. For example, the invention contemplates mixtures of dihydric phenols with not more than about 25 mol percent of trihydric or not more than about 12 mol percent of tetrahydric phenols or functionally equivalent mixtures of the three. Preferably, penta and hexahydric phenols will not be employed.

The ADP's employed for reaction with the polybasic acids or polybasic acid anhydrides in accordance with the invention conveniently may be prepared by the reaction of the polyhydric phenols with epihalohydrins, diepoxides or alcoholic hydroxyl-containing dihalohydrins using the polyhydric phenol in excess proportions such that there is present in the final composition unreacted phenolic hydroxyl groups after all of the halide and/or epoxide groups have been reacted with phenolic hydroxyl groups. It is desirable that the ADP composition contain not more than 3 alcoholic hydroxyl groups and preferably not more than 2 alcoholic hydroxyl groups per molecule in order to give the desired degree of crosslinking of the ADP molecules in reaction with polybasic acids. Preparation of specific preferred ADP's is illustrated by the following schematic formulae:

(1) Reaction of 3 mols of bis(4-hydroxyphenyl)dimethyl methane, known commercially as bisphenol A, with 2 mols of epichlorohydrin:

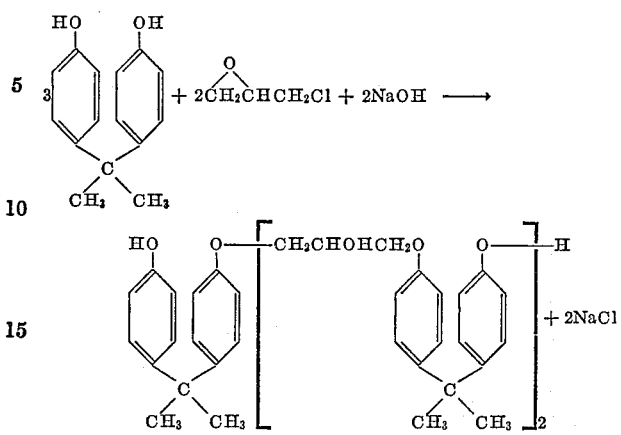

(2) The reaction of 2 mols of tetrachlorobisphenol A with 1 mol of 1,3-glycerol dichlorohydrin:

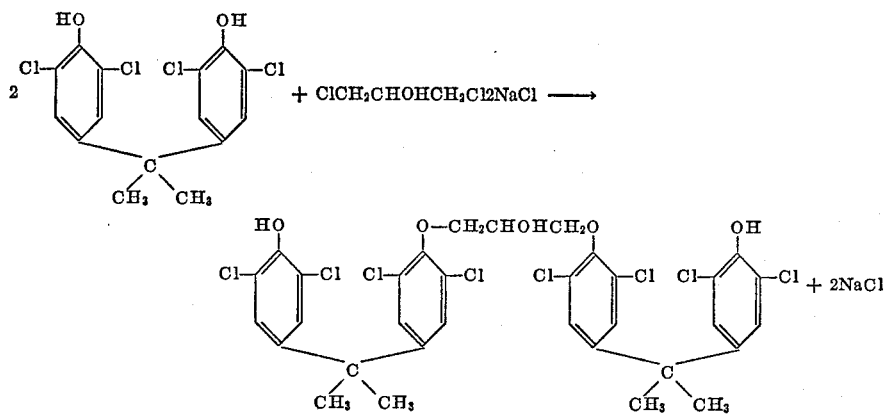

(3) The reaction of 2 mols of the methyl ester of 4,4'-bis(4-hydroxyphenyl) pentanoic acid with 1 mold of diepoxybutane

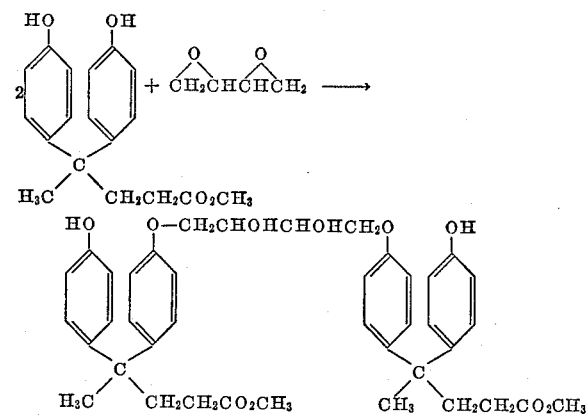

It is understood that these reactions as illustrated by Formulae 1, 2, and 3 do not give pure compounds but give mixed products in which the predominating structure is that shown by the formula and the average composition approaches that shown by the formula. Illustrative of the available polyhydric phenols which may be used in this preparation are bisphenol A, halogenated bisphenol A, hydroquinone, resorcinol, bis(4-hydroxyphenyl)sulfone, a bisphenol prepared from the condensation of 1 mol of dipentene with 2 mols of phenol (U.S. Patent 2,811,564), alkylidene diphenols prepared from methyl ketones and cyclic ketones with phenol, dihydroxy naphthalenes, phloroglucinol, and trihydric phenols prepared by the condensation of acrolein with phenol (U.S. Patent 2,801,989).

U.S. Patents 2,510,885, 2,510,886 and 2,592,560 disclose the preparation of ADP's by the reaction of excess proportions of dihydric phenols with dihalides, epihalohydrins, and diepoxides. The conditions for the reaction of an aliphatic hydroxyl-containing dichloride with excess quantities of a polyhydric phenol are essentially those of heating the mixture in the presence of sufficient alkali to neutralize the chloride content. Likewise, the reaction of epihalohydrins with excess portions of polyhydric phenols in preparing the ADP's consists of heating the reaction mixture in the presence of sufficient alkali to neutralize the chloride content of the epihalohydrin. The reaction of a diepoxide with excess quantities of polyhydric phenols is normally carried out by heating the mixture at temperatures of from 75–200° C. in the presence of small quantities of alkaline catalysts such as potassium hydroxide, sodium hydroxide, or tertiary amines.

Illustrative of the dihalo alcohols, epihalohydrins, and diepoxides which may be used in reaction with the dihydric and trihydric phenols to prepare alcoholic phenols are glycerol dichlorohydrin, epichlorohydrin, diepoxy butane, limonene diepoxide, diglycidyl ethers of dihydric phenols, and polyglycidyl ethers of glycerol and pentaerythritol.

Polybasic acids which may be used in reaction with the alcoholic hydroxyl content of the ADP's include such acids as the isomeric phthalic, malonic, methyl malonic, succinic, methyl succinic, sym-dimethyl succinic, unsym dimethyl succinic, glutaric, adipic, pimelic, suberic, azelaic, sebacic, brassilic, maleic, fumaric, citraconic, mesaconic, itaconic, glutaconic, tricarballylic, aconitic, and citric acids; endo-cis-bicyclo(2,2,1)-5-heptene-2,3 dicarboxylic anhydride, dimerized rosin, the oxyacetic acids prepared from polyhydric phenols, and saturated and unsaturated long-chain aliphatic acids such as hexadecanedioic, heptadecanedioic, octadecanedioic, nonadecanedioic, eicosanedioic, heneicosanedioic, docosanedioic, tricosanedioic, tetracosanedioic, pentacosanedioic, hexacosanedioic, heptacosanedioic, octacosanedioic, nonacosanedioic, triacontanedioic, hentriacontanedioic, dotriacontanedioic, tetratriacontanedioic, pentatriacontanedioic, hexatriacontanedioic, octatriacontanedioic, hexatetracontanedioic, 8,12-eicosadienedioic acids, and dimers and trimers of acids such as 9-hexadecenoic, 9-octadecenoic, 9,12-octadecadienoic, 9,12,15-octadecatrienoic, 9,11,13-octadecatrienoic, 6-octadecenoic, 11-octadecenoic, 9-eicososenoic, 11-docosenoic, 13-docosenoic, 15-tetracosenoic, 17-hexacosenoic, 21-triacontenoic, 6,10-14-hexadecatrienoic, 10,12,14-octadecatrienoic, 4,8,12,15-octadecatetraenoic, 9,11,13,15-octadecatetraenoic, and 5, 8,11,14-eicosatetraenoic acids.

Many of the commercial polybasic acids such as phthalic, maleic, and succinic acids are available commercially in the anhydride form, and these anhydrides are conveniently used in reaction with the ADP's to give the cross-linked esters of this invention. There are also available a number of anhydrides prepared by the Diels-Alder reaction of maleic anhydride with dienes such as butadiene, cyclopentadiene, methyl cyclopentadiene, and piperylene, and these anhydrides are valuable coupling agents for esterification of the ADP's to give the resinous polyhydric phenols of this invention. Therefore, when the word "acid" is employed in the appended claims, it is intended to embrace both the acid and its anhydride where such anhydrides exist.

In accordance with the invention, it has been discovered that when the acid reacted with ADP is a long-chain aliphatic acid in which the acid structure contains an aliphatic chain having at least sixteen carbon atoms, the resulting resinous polyhydric phenol exerts a marked flexibilizing effect on the cured product of the polyhydric phenol and polyepoxide.

The aliphatic polybasic acids when may be employed include the polymerized vegetable oil acids. Commercially available polymerized vegetable oil acids are illustrated by the so-called dimer and trimer acids containing 2 and 3 carboxylic acid groups per molecule and obtained by polymerizing 18-carbon aliphatic olefin-containing vegetable oil acids. Typical acids used in preparing these dimer and trimer acids are the acids prepared by saponification of corn oil, cottonseed oil, soybean oil, linseed oil, and China-wood oil. Some of the unsaturated acids constituting marine oils contain more than 18-carbon chains. These unsaturated acids, too, may be used in preparing the dimer and trimer acids. Another source of the polymerized vegetable and marine oil type aliphatic acids is that of the so-called oil pitches. These materials, which are often the residues of the long-chain acid distillation process, are essentially crude, highly polymerized acids. These materials are valuable in esterification of the alcoholic diphenols in preparing the flexibilizing, resinous, polyhdric phenols of this invention.

Another source of long-chain aliphatic dibasic acids having at least 16 carbon atoms per molecule are the acids prepared, for example, by the reaction of cyclohexanone with hydrogen peroxide and butadiene in accordance with U.S. Patents 2,764,497 and 2,832,799. Typical of these acids is 8,12-eicosadienedioic acid having the formula $HO_2C(CH_2)_5CH_2CH=CHCH_2$
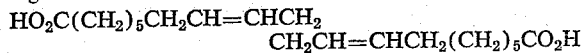

These dienedioic acids having the general formula $(CH_2CH=CHCH_2(CH_2)_3 \text{ to }_5CO_2H)_2$ may be hydrogenated to give the saturated long-chain dioic acids which are also valuable dibasic acids for esterification of the alcoholic diphenols in preparing the flexibilizing, resinous, polyhydric phenols of this invention.

A typical structure of a flexibilizing polyhydric phenol may be shown by the following formula based on esterification of 2 mols of an alcoholic diphenol from bisphenol and epichlorohydrin with 1 mol of di-oleic acid (9-octadecenoic acid).

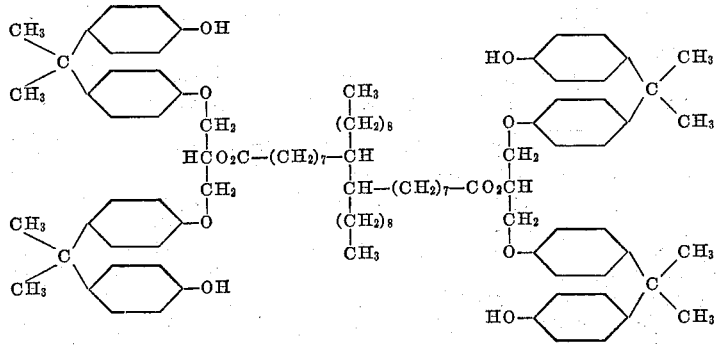

Esterification of the ADP's with polybasic acids or polybasic acid anhydrides is conveniently carried out by heating the reactants at high temperatures, usually in the temperature range of 190–300° C. until the desired acid value is obtained. The high temperature esterification may be carried out in the presence of an inert gas passed through the continuously agitated mixture so as to remove the water of condensation as it is formed. Another procedure of high temperature esterification commonly used is that of adding sufficient hydrocarbon solvent to give constant reflux at the esterification temperature permitting the reflux solvent to return to the reaction mixture from a reflux condenser attached to the reaction chamber through a water leg which serves to prevent the water of condensation from returning to the reaction mixture. Another method which might be used in preparing the subject resinous polyhydric phenols is that of the alcoholysis of low molecular weight alcohol esters of the polybasic acids with the ADP's. To illustrate, the ADP might be heated with the dimethyl ester of isophthalic acid at 200–235° C. in the presence of a trace of calcium acetate, thus giving liberation of methanol and esterification of the alcohol content of the ADP.

In accordance with the invention, the resinous polyhydric phenols have at least four phenolic hydroxyls per molecule and are characterized by the structural formula:

wherein A is the residue of an alcoholic hydroxyl containing molecule, X is the residue of a polyhydric phenol and R is the residue of a polycarboxylic acid connected to A by an ester linkage. The polycarboxylic residue R may contain additional carboxyl groups.

In accordance with the invention, both aromatic and aliphatic polyepoxides generally may be admixed with the resinous polyhydric phenols formed by reaction of alcoholic diphenols and polybasic acids to form stable mixtures quickly curable to solid, infusible, insoluble products on application of heat.

Illustrative of the epoxide compositions which may be employed in this invention are the complex epoxide resins which are polyether derivatives of polyhydric phenols with such polyfunctional materials as polyhalohydrins, polyepoxides, or epihalohydrins to form polymeric, polyhydric alcohols having alternating aliphatic chains and aromatic nuclei connected to each other by ether linkages. Typical of these complex epoxide resins are the reaction products of bis(4-hydroxyphenyl) dimethyl methane with excess molar portions of epichlorohydrin.

the so-called polyallyl glycidyl ether (PAGE) having the chemical structure corresponding closely to the following formula:

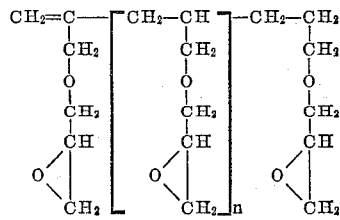

These products in which $n=0$ to about 7 are available in experimental quantities from the Shell Chemical Corporation.

Still other aliphatic polyepoxides which may be used may be illustrated by the poly(epoxyalkyl) ethers of polyhydric alcohols. These polyepoxides, for instance, may be obtained by reacting a polyhydric alcohol with an epihalohydrin followed by dehydrohalogenation. Illustrative is the reaction, for example, of epichlorohydrin with glycerol in the presence of boron trifluoride to give an intermediate chlorohydrin which is dehydrohalogenated to give a mixed product represented by the following formula:

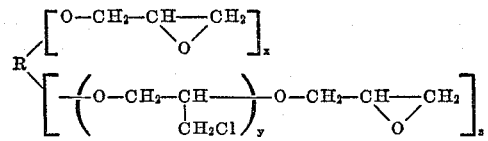

wherein R is a glycerol residue, $x$ is 1 to 2, $y$ is 1 to 2, $z$ is 1 to 2, and $x+z=2$ to 3. A typical commercial product of this type is Epon 562 having an equivalent weight to epoxide content of approxiately 150, marketed by the Shell Chemical Corporation. The preparation of a large number of these mixed polyepoxides is described more fully in Zech's U.S. Patent 2,581,464.

Still other aliphatic polyepoxides which have been found to be valuable in reaction with the resinous polyhydric phenols in producing the products of this invention include diepoxybutane, diglycidyl ether, limonene diepoxide, diepoxydicyclopentadiene, and the epoxidation products obtained by peracid oxidation of unsaturated vegetable oils and fish oils.

In general, in preparing the new composition, the epoxides and the resinous polyhydric phenols are mixed in suitable proportions with the addition of a catalyst and polymerization is then carried out by the application of heat. Varying proportions of the resinous polyhydric phenols and the epoxides may be used in preparing the compositions. The epoxide groups react by

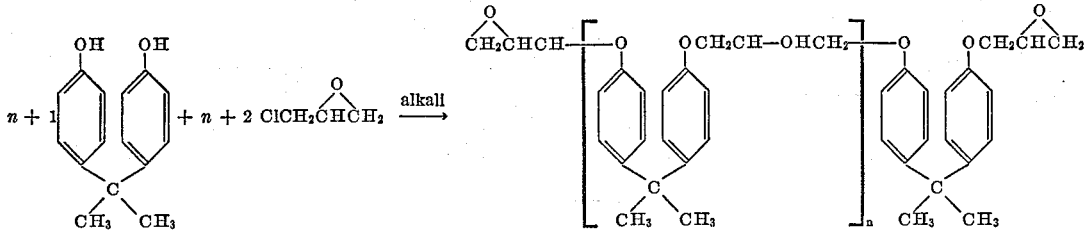

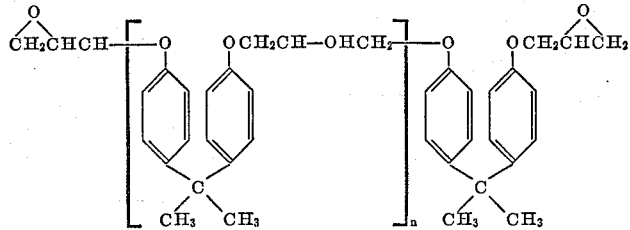

As used in the above formula, $n$ indicates the degree of polymerization and may have the value of 0 or a whole number. Typical of these complex epoxide resins are those marketed by the Shell Chemical Corporation under the trade names of Epon 828, Epon 864, Epon 1001, Epon 1004, Epon 1007, Epon 1009, and Epon 1310.

The epoxide compositions which may be used in preparing the compositions of this invention also include aliphatic polyepoxides which may be illustrated by such polyepoxides as the polymerization products obtained by polymerizing epoxyalkyl alkenyl ethers such as allyl glycidyl ether through the unsaturated portion to give direct addition with the active hydrogen-containing phenolic hydroxyl groups and with the active hydrogen of carboxylic acid groups often present in small amounts due to incomplete esterification of the alcoholic content of the alcoholic diphenols with the polybasic acids or to using excessive amounts of polybasic acids over that amount equivalent to the alcoholic hydroxyl content of the ADP. It is also known that the epoxide groups may react to some extent with the alcoholic hydroxyl groups which, too, may be present in small amounts from unesterified alcoholic content of the alcoholic diphenols and the alcoholic hydroxyl groups which are ever present as a result of the addition reaction of the epoxide group to an active hydrogen-containing group liberating with each epoxide group addition an alcoholic hydroxyl group.

Valuable complex reaction products may be obtained, for instance, from mixtures wherein the epoxide content of the epoxide compositions is substantially equivalent to the total phenolic hydroxyl content of the resinous polyhydric phenols. Valuable products may also be obtained by reacting mixtures wherein either the phenolic hydroxyl groups or the epoxide groups are in excess of this amount. In general, the polyepoxides should be present in an amount sufficient to react with at least 2 and preferably more than 2 of the phenolic hydroxyl groups of the resinous polyhydric phenol which contains 4 or more phenolic hydroxyl groups per molecule. Since polyepoxides may polymerize with themselves without the addition of resinous materials of the polyhydric phenol type, excessive amounts of the polyepoxides may be used in the reaction mixtures to any degree provided sufficient amount of the resinous polyhydric phenol is used to give the desired properties to the final infusible, insoluble product.

Conversion of the mixtures to more highly polymerized products may be obtained without complete reaction of the epoxide groups with the phenolic hydroxyl groups. In the preparation of intermediate reaction products, one might, for example, desire that about 50% of the epoxide groups and about 50% of the phenolic hydroxyl groups be reacted so as to give an intermediate composition which may be later completely cured by the application of heat. The mixed compositions of the present invention have been found to be readily susceptible to the preparation of the intermediate reaction products. This is advantageous for many industrial applications which require that the initial mixture react sufficiently to be in the dry, solid state and this dry, solid state be fusible on the application of heat and be sensitive to conversion to complete insolubility and infusibility on the application of heat. A typical industrial application of such stage curing mixtures is that of coating copper foil which is passed through a baking oven for a limited period of time so as to give a partial cure at which stage the coated copper foil may be rolled into a convenient package for storage or shipment and at some later date the resin-coated surface may be bonded to another surface by the application of heat sufficient to initially fuse the material and finally convert it to the infusible, insoluble state.

It has been found that mixtures of polyepoxides and resinous polyhydric phenols containing a small amount of a tertiary amine catalyst may be deposited as thin coating films from a solvent solution and allowed to stand for several months as a dry, tack-free film and then treated with heat at which time the material passes through a tacky state and then cures to an insoluble, infusible state. Likewise, molded objects have been prepared from mixtures of the polyepoxides and the resinous polyhydric phenols by melting them together in the desired proportions, adding thereto while in the liquid state sufficient amount of catalyst to the molten mixture and cooling rapidly to room temperature. Such dry, tack-free objects after standing for several months at ordinary temperatures may be submitted to heat at which time they pass through the tacky state and finally cure to the insoluble, infusible state.

In making the new compositions and products herein described, the epoxide compositions and the resinous polyhydric phenols may be used with each other in regulated proportions and without the addition of other materials may be included, however, such as filling and compounding materials, pigments, plasticizers, etc.

Catalysts which are active in inducing the epoxide groups to react with the phenolic groups of the resinous polyhydric phenols include alkaline materials such as sodium phenoxide and organic amines as well as certain acid-type catalysts such as the mineral acids, boron trifluoride, aluminum chloride, and zinc chloride. Preferable catalysts, however, are the alkaline types such as the tertiary amines which tend to favor the reaction of the epoxide group with phenolic hydroxyl groups as compared to the reaction of epoxide group with alcoholic hydroxyl groups, and the use of these tertiary amines in catalytic quanties induces negligible weaknesses towards water, alkali, and chemical resistance as a result of the presence of the amine.

In addition to having outstanding physical properties such as hardness, toughness, and flexibility, the final infusible, insoluble products derived from the new compositions have outstanding chemical properties such as resistance to water, alkali, and solvents. It has also been observed that the intermediate reaction products and the final conversion products possess unusually high adhesion to most surfaces including metal, glass, wood, and plastic surfaces. This physical property of outstanding adhesion to a wide variety of surfaces is particularly important in the formulation of adhesives and in the formulation of protective coatings where it is desirable that the films adhere to many types of surfaces. The unusual adhesive characteristics are probably due to the fact that the reaction products described herein contain a high percentage of highly polar groups such as ether groups, ester groups, and alcoholic hydroxyl groups. Even though the new compositions of the present invention contain a high percentage of polar groups in the insoluble, infusible state, the tolerance for water is unusually low, apparently due to the high molecular weight and rigid cross-linked structure of the final compositions. Reaction mixtures of epoxide compositions and the resinous polyhydric phenols were found generally to be quite stable at room temperatures showing negligible viscosity increase of their solvent solutions on standing over relatively long periods of time. Even after the converting catalyst has been added, such solutions are often stable for several months before becoming too viscous for use in applying films or in impregnating fibers.

The following examples will serve to illustrate this invention, however, it should be understood that the invention is not intended to be limited thereby. In these examples, proportions expressed are parts by weight unless otherwise indicated. Softening points as used herein were run by the Durran's mercury method (Journal of Oil and Colour Chemists' Association, 12, 173–175 [1929]). Acid values as used herein are defined as the number of milligrams of potassium hydroxide equivalent to the free acid contained in a one-gram sample. Epoxide contents are measured by heating one-gram samples with an excess of pyridine containing pyridine hydrochloride (made by adding 16 cc. of concentrated hydrochloric acid per liter of pyridine) at the boiling point for 20 minutes and then back titrating the excess pyridine hydrochloride with 0.1 N potassium hydroxide using phenolphthalein as indicator and considering that 1 mol of the HCl is equivalent to one epoxide group.

Examples I through V illustrate the preparation of alcoholic diphenols used in reaction with polybasic acids and polybasic anhydrides to give the resinous polyhydric phenols which are used in reaction with polyepoxides to give the products of this invention.

EXAMPLE I

*Preparation of an Alcohol Diphenol from 2 Mols of Bisphenol A (BPA) and 1 Mol of Epichlorohydrin (Epi)*

Ingredients:
  BPA _____ 1,824 parts (8 mols).
  NaOH (97.9%) _____ 327 parts (8 mols).
  Epichlorohydrin _____ 370 parts (4 mols).
  $H_2O$ _____ 1,824 parts.
  $H_2SO_4$ _____ 798 parts.

The reaction was carried out in an 8-liter stainless steel beaker provided with a mechanical agitator, thermometer, and a baffle blade (large spatula). The BPA and NaOH were dissolved in the water by heating, with agitation, to 70–75° C. The mixture was cooled to 50° C. and all of the epi added after which the temperature rose to 75–80° C. through exothermic heat. The temperature was raised to 90–95° C. over a period of 15 minutes and held at this temperature for 1 hour continuing agitation throughout the reaction period. The sulfuric acid was added until the solution was acid to litmus while holding the temperature at 80–95° C. with continuous stirring. The water-salt layer was removed by decantation and the taffy-like resin washed 4–5 times by stirring, each time with about 2 liters of water at 90° C. for a period of 15–20 minutes. After decantation of the last wash water, the resin was dried by stirring and heating to a final temperature of 150° C. giving approximately 2000 parts of a straw-colored resin melting at 77.5° C. Analysis showed this resin to contain a total of alcoholic and phenolic hydroxyl content of 10.3% by weight, no epoxide content, and an acid value of 3.

EXAMPLE II

*Preparation of Alcoholic Diphenol From 3 Mols of BPA and 2 Mols of Epichlorohydrin*

Ingredients:
  BPA _____ 1,824 parts (8 mols).
  NaOH (97.9%) _____ 327 parts (8 mols).
  Epichlorohydrin _____ 493 parts (5⅓ mols).
  $H_2O$ _____ 1,824 parts.
  $H_2SO_4$ (6 N) _____ 534 parts.

The preparation was made in accordance with the procedure described in Example I. The straw-colored, resinous product amounting to 2095 parts had a softening point of 89° C., a total alcoholic and phenolic hydroxyl content of 9.5% by weight, no epoxide content, and an acid value of 2.5.

EXAMPLE III

*Preparation of an Alcoholic Diphenyl From 2 Mols of Tetrachlorobisphenol A and 1 Mol of Epichlorohydrin*

Ingredients:
  Tetrachlorobisphenol A ____ 732 parts (2 mols).
  NaOH (97.9%) _____ 82 parts (2 mols).
  Epichlorohydrin _____ 92.5 parts (1 mol).
  $H_2O$ _____ 736 parts.
  $H_2SO_4$ (6 N) _____ 200 parts.

The preparation was made in accordance with the procedure described in Example I giving a resinous product having a softening point of 64° C., an acid value of 186, a total hydroxyl of 7.2%, and no epoxide content. The acid value represents partial titration of the phenolic hydroxyl content using phenolphthalein as an indicator and titrating against methanolic potassium hydroxide.

EXAMPLE IV

*Preparation of an Alcoholic Diphenol From 2 Mols of Resorcinol and 1 Mol of Limonene Diepoxide*

Ingredients:
  Resorcinol _____ 110 parts (1 mol).
  Limonene diepoxide _____ 84 parts (1 equivalent).
  DMP - 30 [tris(dimethyl-
    aminomethyl) phenol
    available from the Rohm
    & Haas Company]____ 388 parts.

The resorcinol, limonene diepoxide, and DMP–30 were heated together in a stainless steel beaker until molten and then heated with continuous agitation to 175° C. and held at this temperature for 1 hour. The resinous product had a softening point of 72° C., an acid value of 120, a total hydroxyl content of 16.3%, and an epoxide content of 0.

EXAMPLE V

*Preparation of an Alcoholic Diphenol From 2 Mols of Dipentene Diphenol (Condensation Product of 2 Mols of Phenol With Dipentene in Accordance With Patent No. 2,811,564) and 2 Equivalents of Epon 562 Having an Equivalent Weight to Epoxide of 150*

Ingredients:
  Dipentene Diphenol ____ 324 parts (1 mol).
  Epon 562 _____ 150 parts (1 equivalent).
  DMP – 30 [2,4,6 - tris(di-
    methylamino methyl)
    phenol marketed by
    Rohm & Haas Com-
    pany] _____ 4.74 parts.

To a molten mixture of the dipentene diphenol and Epon 562 in a stainless steel beaker provided with a thermometer and a mechanical agitator was added slowly with rapid agitation the DMP-30. The reaction mixture was heated with continuous agitation at 172–195° C. over a period of 35 minutes and held at 195–199° C. for a period of 1 hour. The resinous product had a softening point of 102° C., an acid value of 6.4, a total hydroxyl content of 6.85%, and an epoxide content of 0.

EXAMPLE VI

*Preparation of an Alcoholic Diphenol From 2 Mols of Cardolite NC–512 and a Diglycidyl Ether of Bisphenol A*

The diglycidyl ether of bisphenol A had an epoxide equivalent weight of 175. Cardolite NC–512 is a commercial dihydric phenol obtained from the Minnesota Mining and Manufacturing Company and stated to have the following structure

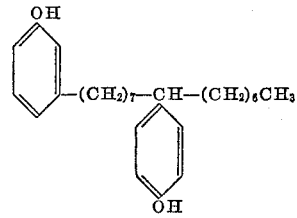

Ingredients:
  NC–512 _____ 274 parts (.5 mol).
  Diglycidyl ether of BPA 58 parts (.25 equivalent).
  DMP–30 _____ 3.32 parts.

To a molten mixture of NC–512 and the diglycidyl ether of BPA in a stainless steel beaker provided with a thermometer and a mechanical agitator was added slowly with agitation the DMP–30. The reaction mixture was heated with continuous agitation at 175–196° C. for 20 minutes and held at 196–200° C. for 1 hour. The resinous product had a softening point of 55° C., an acid value of 6.6, a total hydroxyl content of 5.9%, and an epoxide content of 0.

Examples VII through Example XXI illustrate the preparation of the resinous polyhydric phenols used in reaction with the polyepoxides to form the new products of the invention.

EXAMPLE VII

*Esterification of the ADP of Example I With Phthalic Anhydride*

A mixture of 512 parts of the resin of Example I and 59.24 parts (.8 equivalents to the alcoholic hydroxyl content) of phthalic anhydride was placed in a 1-liter, 3-neck flask provided with a thermometer, a mechanical agitator, and a condenser attached through a water leg. The mixture was heated and agitation initiated as soon as the mixture had become molten. When the temperature had reached 190° C., 50 parts of xylene was added and heating continued with continuous agitation to 250° C. At this point, the amount of xylene present in the mixture was regulated to give constant reflux into the condenser so as to remove the water of condensation into the water leg as the reaction proceeded. The reaction mixture was heated at 250 to 267° C. for a period of 4 hours and 20 minutes at which time the pressure was reduced to 15 mm. in order to remove the xylene from the resinous product. The product had a softening point of 91.5° C. and an acid value of 3.

EXAMPLE VIII

*Esterification of the ADP of Example IV With Succinic Acid*

A mixture of 77.6 parts of the resinous dihydric phenol of Example IV and 12.8 parts of succinic acid was heated together in a stainless steel beaker. When the mixture had reached the molten state, mechanical agitation was initiated and continued throughout the reaction period. The reaction mixture was heated in the temperature of 232 to 243° C. for 2 hours and 32 minutes to give a product having a softening point of 160° C. and an acid value of 110.

EXAMPLE IX

*Esterification of the ADP of Example III With Maleic Anhydride*

A mixture of 396 parts of the ADP of Example III and 31 parts of maleic anhydride were esterified in accordance with the method described in Example VII using xylene as the reflux solvent and heating the reaction mixture at 230 to 245° C. for a period of 3 hours and 43 minutes to give a product having a softening point of 130° C. and an acid value of 180.

EXAMPLE X

*Esterification of the ADP of Example VI With Endo-cis-Bicyclo(2,2,1)-5-Heptene-2,3 Dicarboxylic Anhydride*

A mixture of 117 parts of the resinous ADP of Example VI and 8.2 parts endo-cis-bicyclo(2,2,1)-5-heptene-2,3 dicarboxylic anhydride ("Nadic Anhydride," manufactured by the National Aniline Division, Allied Chemical & Dye Corporation) was heated in an open stainless steel beaker until the molten state was reached at which point mechanical agitation was initiated. With continuous agitation, the reaction mixture was heated for a period of 2 hours at 218–247° C. to give a product having an acid value of 18 and a softening point of 75° C.

EXAMPLE XI

*Esterification of the Resinous ADP of Example I With Adipic Acid*

In accordance with the method described in Example VII, a mixture of 384 parts of the resinous ADP of Example I and 73 parts of adipic acid was esterified in the presence of refluxing xylene for a period of 3 hours and 13 minutes at 240–261° C. followed by removal of the xylene to give a product having a softening point of 95.5° C. and an acid value of 10.5.

EXAMPLE XII

*Esterification of the Resinous ADP of Example I With Azelaic Acid*

In accordance with the procedure described in Example VII, a mixture of 1024 parts of the resinous ADP of Example I and 141 parts of azelaic acid was heated in the presence of refluxing xylene in the temperature range of 255 to 278° C. for a period of 5 hours followed by removal of the xylene to give a resinous product having a softening point of 90° C. and an acid value of 6.1.

EXAMPLE XIII

*Esterification of the Resinous ADP of Example I With Dimerized Rosin (Dimerex Resin Obtained From the Hercules Powder Company)*

A mixture of 480 parts of the dimerized rosin and 1024 parts of the resinous ADP of Example I was esterified in the presence of refluxing xylene at 270 to 280° C. for a period of 5 hours and 50 minutes followed by removal of the xylene to give a product having a softening point of 94° C. and an acid value of 10.

EXAMPLE XIV

*Esterification of the Resinous ADP of Example II With Dimerized Rosin*

In accordance with the procedure described in Example VII except replacing the refluxing xylene with a constant bubbling of carbon dioxide through the reaction mixture, a mixture of 398 parts of the resinous ADP of Example II and 265 parts of dimerized rosin was heated at 255 to 271° C. for a period of 6 hours to give a product having a softening point of 108° C. and an acid value of 4.4.

EXAMPLE XV

*Esterification of the Resinous ADP of Example I With a C–36 Dimerized Vegetable Oil Acid (Dimer Acid 3079–S, Acid Value 190, Dimer Acid Content 95%, Trimer Acid Content 4%, Monomer Acid Content 1%, Obtained From Emery Industries, Inc.)*

A mixture of 400 parts of the resinous ADP of Example I and 174 parts of the dimer acid was placed in a 2-liter, 3-neck flask provided with a thermometer, a mechanical agitator, and a condenser attached through a water leg. The mixture was heated and agitation initiated as soon as the mixture had become molten. When the temperature had reached 190° C. 100 parts of xylene was added and heating continued with agitation to 240° C. The amount of xylene present in the mixture was regulated so that constant reflux into the condenser was attained so as to remove the water of condensation into the water leg as the reaction proceeded. The reaction mixture was heated for 1 hour at 240–245° C. and the temperature then increased to 270° C. and held in the range of 262–275° C. for a period of 5 hours and 40 minutes. The acid value on the non-volatile content at this point was 5.8 and the softening point was 74.5° C. The xylene was removed from the product by reducing the pressure to 15 mm. of mercury, keeping the pot temperature at 250° C. while rapidly agitating the reaction mixture.

EXAMPLE XVI

*Esterification of the Resinous ADP of Example II With Dimer Acid 3079–S*

In accordance with the procedure used in Example VII, a mixture of 400 parts of the resinous ADP of Example II and 450 parts of dimer acids were heated with continuous agitation in the presence of refluxing xylene at 227–237° C. for a period of 1.5 hours followed by removal of the xylene by reducing the pressure to 15 mm. of mercury. The product had an acid value of 52.7 and a softening point of 62° C.

EXAMPLE XVII

*Esterification of the Resinous ADP of Example I With C–54 Trimerized Vegetable Oil Acids (Emery Trimer Acid No. 3055–S, Acid Value 190, Trimer Acid Content 70–85%, Dimer Acid Content 15–30%, Available From Emery Industries)*

A mixture of 256 parts of the resinous ADP of Example I and 225 parts of the trimer acid was heated in a stainless steel beaker provided with a mechanical agitator, a thermometer, and a means of bubbling $CO_2$ into the reaction mixture. With continuous addition of carbon dioxide, the reaction mixture was heated to 140° C. at which point mechanical agitation was initiated. The mixture was heated gradually to 228° C. and held in the range of 228–232° C. for a period of 1 hour and 20 minutes. The reaction product had an acid value of 50 and a softening point of 67.5° C.

EXAMPLE XVIII

*Esterification of the Resinous ADP of Example I With Cottonseed Pitch, a Polymerized Residual Acid From High-Temperature Distillation of Cottonseed Oil Acids Having an Acid Value of 85 (Available From Armour Chemical Division of Armour and Company)*

In accordance with the procedure described in Example XV, a mixture of 256 parts of the resinous ADP of Example I and 300 parts of the cottonseed pitch were esterified with continuous agitation in the presence of refluxing xylene. The temperature was gradually raised to 268° C. and held at 268–275° C. for a period of 1 hour and 20 minutes. The reaction mixture was allowed to cool to 200° C. and further cooled by adding sufficient xylene to give a non-volatile content of 67%. The acid value on the non-volatile content was 12.

EXAMPLE XIX

*Esterification of the Resinous ADP of Example III With C–54 Trimer Acid 3055–S*

In accordance with the procedure of Example VI, 158 parts of the resinous ADP of Example III and 60 parts of trimer acid (Emery No. 3055–S) was heated with continuous agitation in the presence of refluxing xylene at 230–245° C. for a period of 2.5 hours. The reaction mixture was cooled to 200° C. and further cooled by adding sufficient xylene to give a non-volatile content of 50%. The acid value on the non-volatile content was 174.

EXAMPLE XX

*Esterification of the Resinous ADP of Example V With Dimer Acid 3079–S*

A mixture of 47 parts of the resinous ADP of Example V and 11.5 parts of dimer acid (Emery No. 3079–S) was heated with continuous agitation in a stainless steel beaker for a period of 1 hour gradually raising the temperature from 175 to 210° C. The product at this point had an acid value of 23. It was dissolved in xylene to give a non-volatile content of 50%.

EXAMPLE XXI

*Esterification of the Resinous ADP of Example VI With the Dimethyl Ester of a C–20 Dibasic Acid, Eicosadienedioic Acid (Available From the Shell Chemical Corporation)*

In a 1-liter, 3-neck flask provided with a thermometer, a mechanical agitator, and a condenser attached to a vacuum system was placed 117 parts of the resinous ADP of Example VI and 37 parts of a dimethyl ester of the C–20 dibasic acid, eicosadienedioic acid, and .2 part of sodium methoxide. The reaction mixture was heated to 227° C. and held in the range of 227–235° C. for a period of 2 hours and 45 minutes keeping the reacting system at a pressure of 15 to 20 mm. of mercury throughout the reaction period. The resulting product was a semi-solid, resinous material having complete solubility in xylene. Xylene was added to give a product containing 50% non-volatile content.

Products of the type described in Examples VII through XXI representing the resinous polyhydric phenols need not be of high purity to be of value in reaction with polyepoxides to produce the products of this invention. In general, it has been found that when the alcoholic diphenols such as those described in Examples I through VI are esterified with .5 to 1.5 equivalents of dibasic acid to each mol of alcoholic diphenol the products contain a sufficiently high average number of phenolic hydroxylic groups per molecule to readily convert polyepoxides to the insoluble, infusible products. In the case where less than one equivalent amount of polybasic acid or polybasic acid anhydride is used in esterification of one mol of the ADP, the product would consist of a mixture of some unreacted ADP and some coupled ADP of higher functionality. In the case where more than equivalent amounts of the polybasic acids or the polybasic acid anhydrides are used to the alcoholic hydroxyl content of the ADP in esterification there would be present in the composition some free carboxylic acid groups as well as the phenolic hydroxyl groups. Such mixed compositions from using excess quantities or deficient quantities of the acid or anhydrides for esterification give excellent reactivity when used in combination with the polyepoxides to form the insoluble, infusible products of this invention. The resinous polyhydric phenols containing in the over-all composition an average of at least 4 phenolic hydroxyl groups per molecule give excellent conversion of epoxides such as the commercial epoxide resins prepared from bisphenol A and epichlorohydrin and containing, in certain cases, as low as 1.4 epoxide groups per molecule of the BPA-epichlorohydrin resin. The resinous polyhydric phenols also react with the simpler aliphatic diepoxides such as diglycidyl ether, limonene diepoxide, and the reaction product of glycerol with epichlorohydrin followed by dehydrohalogenation as illustrated by the commercial resin, Epon 562, to give valuable infusible, insoluble products. It has been observed that mixtures of the resinous polyhydric phenols with polyepoxides in the presence of catalysts such as alkali phenoxides or tertiary amines are stable for long periods of time at room temperature whether they be stored as solvent solutions or in the solid state. This is of particular value in that such mixtures may be stored in solutions for several weeks before application as coating or impregnating materials, they may be stored for long periods of time as thin films which have been deposited from the solvent solutions, or they may be stored for long periods of time in thick layers corresponding to molded objects finally completing conversion after the long period of standing by the application of heat such that the material is heated, for example, in the temperature range of 75 to 200° C. for periods ranging from less than 1 minute up to 1 or 2 hours depending on the particular composition, the catalyst, the amount of catalyst, and the temperature of baking.

Examples XXII through XXXVII demonstrate the reaction of the resinous polyhydric phenols with polyepoxides to form the new compositions of this invention.

EXAMPLE XXII

A mixture of 113 parts of the resinous polyhydric phenol of Example VII, 133 parts of polyallyl glycidyl ether (PAGE), and .84 part of DMP–30 dissolved in methyl isobutyl ketone to give 50% non-volatiles remained sufficiently fluid for application as a varnish for a period of 2 months. Thin films of .003-inch thickness prepared from this varnish cured to an extremely hard, yet flexible, material on baking for 10 minutes at 150° C. This film showed no signs of deterioration on subjecting to boiling water for a period of 24 hours or on subjecting to 5% aqueous sodium hydroxide heated at 90° C. for a period of 1 hour.

A similar hard, tough, infusible film was obtained on baking for 30 minutes at 150° C. a .003-inch thick wet film from a solution of 38 parts of the resinous polyhydric phenol from Example VII, 55 parts of a commercial epoxy resin having a softening point of 70° C. and an epoxide equivalent weight of 500 (Epon 1001 based on bisphenol A and epichlorohydrin and obtained from the Shell Chemical Corporation), and 1 part DMP–30 dissolved in methyl isobutyl ketone to give 50% non-volatile content. The latter film, too, showed outstanding resistance to boiling water and aqueous alkali.

EXAMPLE XXIII

A mixture of 388 parts of the resinous polyhydric phenol composition of Example VIII and 400 parts of a commercial diglycidyl ether of bisphenol A having an epoxide equivalent weight of 195 (Epon 828 available from the Shell Chemical Corporation) and 8 parts of DMP–30 dissolved in methyl isobutyl ketone to give 50% non-volatile content gave a varnish which when spread in .003-inch wet film thickness converted into an infusible insoluble material on heating for 15 minutes at 150° C. This film was unaffected by submitting to boiling water for a period of 24 hours.

EXAMPLE XXIV

A 50% methyl isobutyl ketone solution of a mixture of 421 parts of the resinous polyhydric phenol of Example IX, 133 parts of PAGE, and 4.5 parts of DMP–30 applied as a .003-inch wet film and baked for 15 minutes at 125° C. gave an extremely hard, infusible material. This film showed no signs of deterioration on subjecting it to boiling water for a period of 5.5 hours or to 5% aqueous sodium hydroxide at 90° C. for a period of 2 hours.

EXAMPLE XXV

A 50% xylene solution of a mixture of 800 parts of the resinous polyhydric phenol of Example X, 500 parts of Epon 828, and 11 parts of DMP–30 gave a varnish which when spread in .003-inch wet films and baked for 30 minutes at 150° C. gave a hard, flexible, infusible product which withstood boiling water for 24 hours and 5% aqueous NaOH at room temperature for 10 hours without signs of deterioration.

EXAMPLE XXVI

A 66% methyl isobutyl ketone solution of a mixture of 69 parts of the resinous polyhydric phenol of Example XI, 33 parts of PAGE, and 1 part DMP–30 spread in films of .003-inch wet thickness converted to a tack-free infusible material on heating for 15 minutes at 150° C. This film showed no deterioration on subjection to boiling water for 24 hours or to 5% aqueous sodium hydroxide for a period of 24 hours at room temperature. The 66% solution had an original viscosity of 2.6 poises and a viscosity of 33.6 poises after 2 weeks.

EXAMPLE XXVII

A 37% methyl isobutyl ketone solution of a mixture of 40.5 parts of the resinous polyhydric phenol of Example XII, 28 parts of Epon 828, and 0.7 parts of DMP–30 gave a varnish, thin films of .003-inch wet film thickness of which gave extremely hard, infusible products on baking for 10 minutes at 150° C. Such films were subjected to boiling water for a period of 48 hours and also to 5% aqueous sodium hydroxide at 90° C. for 5 hours with no visible indication of deterioration. The 37% solution had an original viscosity of 3.7 poises and a viscosity of 22.7 poises after 1 week.

A .003-inch wet film of this same composition was permitted to stand at room temperature for a period of 1 month as a tack-free film after having lost the solvent in a matter of a few hours and then was subjected to heating at 100° C. at which time the film fused to tackiness followed by conversion to the infusible, non-tacky state within a matter of 30 minutes.

EXAMPLE XXVIII

A mixture of 50 parts of the resinous polyhydric phenol of Example XII and 31 parts of Epon 828 were fused together and stirred rapidly while 1.6 parts of DMP–30 was added to the mixture being stirred rapidly at 100° C. for about 30 seconds and poured into a thin layer so as to obtain rapid cooling. This material was broken up into small particles and samples of about 10 grams were baked in a 1½ inch diameter aluminum dish at various periods after standing for 2 months. Material which had stood at room temperature for a period of 2 months fused together and converted to a flexible, infusible, insoluble object on heating for 30 minutes at 150° C.

EXAMPLE XXIX

A mixture of 370 parts of the resinous polyhydric phenol of Example XIII, 133 parts of polyallyl glycidyl ether, and 5 parts of DMP–30 in methyl isobutyl ketone to give a non-volatile content of 65% was spread in .003-inch wet films and baked 1 hour at 150° C. to give a flexible, infusible film. This film withstood boiling water for 10 hours without showing any signs of deterioration.

EXAMPLE XXX

A Mixture of 300 parts of the resinous polyhydric phenol of Example XIV, 133 parts of polyallyl glycidyl ether, and 4.3 parts of DMP–30 dissolved in methyl isobutyl ketone to a non-volatile content of 65% was spread in .003-inch wet films and baked 30 minutes at 150° C. to give a flexible, infusible film. This film showed no signs of deterioration on exposure to boiling water for 10 hours.

EXAMPLE XXXI

A mixture of 50 parts of Epon 1001 (a polyepoxide prepared from pisphenol A and epichlorohydrin having an epoxide equivalent weight of 500 and available from Shell Chemical Corporation), 36.2 parts of the dimer acid ester of Example XV, and 0.86 part of DMP–30 dissolved in an equal weight of methyl isobutyl ketone. A film of this varnish having a wet film thickness of 0.003 inch became tack-free on heating for 5 minutes at 150° C. The same film baked for 30 minutes at 150° C. remained flexible and showed no signs of deterioration on exposure to boiling water for 48 hours, to 5% aqueous NaOH at room temperature for 24 hours, and to 5% aqueous NaOH at 90° C. for 5 hours.

The resistance of this product to 5% aqueous NaOH at 90° C. is very surprising as the composition does contain ester groups. The extreme insolubility is apparently of such magnitude that the hot caustic solution cannot chemically contact the ester groups.

A similar composition without the solvent showed good cure to an infusible object on heating in thick layers (0.5 inch) for 30 minutes at 150° C. This same composition of the dimer ester, Epon 1001, and DMP–30 stored at room temperature for a period of 30 days and then subjected to heating at 150° C. fused and then converted to an infusible object.

EXAMPLE XXXII

A mixture of 69 parts of the dimer ester of Example XVI, 26 parts of polyallyl glycidyl ether (epoxide equivalent weight=133 and containing an average of 3.5 epoxide groups per molecule) and 0.96 part DMP–30 was dissolved in methyl isobutyl ketone to give 67% non-volatile content. This varnish had an initial viscosity of 3.1 poises and a viscosity at the end of 2 weeks of 31.6 poises. Films of 0.003-inch wet film thickness were baked for 30 minutes at 150° C. to give flexible, infusible products which showed no deterioration on subjecting to boiling water for 2 hours or to 5% aqueous NaOH at room temperature for 2 hours.

A similar mixture of 69 parts of the dimer ester, 26 parts of the same polyallyl glycidyl ether, and 0.12 part DMP–30 was found to give films which converted to infusibility on baking for 30 minutes at 150° C. A mixture of 69 parts of the dimer ester, 100 parts of Epon 1001, and 1.69 parts of DMP–30 dissolved in methyl isobutyl ketone to give a non-volatile content of 60% had an initial viscosity of 2 poises, a viscosity of 4.4 poises after 1 week, a viscosity of 36 poises after 40 days, and a viscosity of 162 poises after 60 days.

EXAMPLE XXXIII

A mixture of 70 parts of the trimer acid ester of Example XVII, 26.6 parts of the polyallyl glycidyl ether used in Example XXXII, and 0.97 parts of DMP–30 dissolved in methyl isobutyl ketone to give a non-volatile content of 40% had an initial viscosity of 2.2 poises and 11.8 poises at the end of 1 week. Films of 0.003-inch wet film thickness baked for 30 minutes at 150° C. became infusible and remained extremely flexible. These films showed no deterioration on exposure to boiling water for 2 hours or exposure to 5% aqueous NaOH at room temperature for 2 hours.

EXAMPLE XXXIV

A mixture of 60 parts (based on non-volatile) of the cottonseed oil pitch ester of Example XVIII, 12 parts of diglycidyl ether of bisphenol A having an epoxide equivalent weight of 190, and 1.4 parts of DMP–30 diluted to a 50% non-volatile content with xylene was spread in a 0.003-inch wet film and baked for 18 minutes at 150° C. to give good conversion to an infusible film. The film was very flexible.

EXAMPLE XXXV

A mixture of 22 parts of the 50% solution of the trimer ester of Example XIX, 8 parts of a 50% solution of a diglycidyl ether of bisphenol A (epoxide equivalent weight of 190) in methyl isobutyl ketone and 0.3 part of benzyl dimethyl amine was spread in a 0.003-inch wet film and baked for 30 minutes at 125° C. to give an infusible, flexible film. Where exposed to boiling water or to 5% aqueous NaOH at room temperature for 5 hours, this film exhibited no signs of deterioration.

EXAMPLE XXXVI

A mixture of 20 parts of the 50% solution of the dimer ester of Example XX, 2.6 parts of the polyallyl glycidyl ether used in Example XXXII, and 0.12 part of DMP–30 was spread in a 0.003-inch wet film and baked for 30 minutes at 150° C. to produce a very flexible, infusible product. This film showed no deterioration on exposure to boiling water for 5.5 hours and to 5% aqueous NaOH at 90° C. for 1 hour.

EXAMPLE XXXVII

A mixture of 10 parts of the 50% solution of the $C_{20}$ acid ester of Example XXI, 10 parts of a 50% solution of bisphenol A-epichlorohydrin epoxy resin having an epoxide equivalent weight of 500, and 0.1 part DMP–30 was spread in a 0.003-inch wet film and heated 30 minutes at 150° C. to give a very flexible, infusible film. This film showed no deterioration on exposure to boiling water for 5.5 hours, or to 5% aqueous NaOH at room temperature for 3 hours.

It should be appreciated that, while there are above disclosed but a limited number of embodiments of the product and process of the invention herein presented, it is possible to produce still other embodiments without departing from the inventive concept herein disclosed, and it is to be understood that the invention is to be limited only by the scope of the appended claims.

I claim:

1. A curable mixture stable at ambient conditions comprising a 1,2-polyepoxide and a substantially gel-free, resinous polyhydric phenol having at least 4 phenolic hydroxyls per molecule and characterized by the formula

where A is the trivalent alkyl radical of an esterified alcohol which, prior to esterification, contains 1–3 alcoholic hydroxyl groups, X is a phenolic ether radical and R is a polycarboxylic acid radical connected to A through an ester linkage.

2. A curable mixture according to claim 1 in which R is a dicarboxyl radical which, prior to esterification, is an aromatic polycarboxylic acid.

3. A curable mixture according to claim 1 in which R is a dicarboxyl radical which, prior to esterification, is an aliphatic polycarboxylic acid containing an aliphatic chain of at least 16 carbon atoms.

4. A curable mixture according to claim 1 in which the epoxide is a polyether derivative of a polyhydric phenol and a material selected from the group consisting of polyfunctional halohydrins, epihalohydrins and epoxides.

5. A curable mixture according to claim 1 in which the polyepoxide is a polyepoxyalkyl-alkenyl ether.

6. A curable mixture according to claim 1 in which the polyepoxide is a poly (epoxyalkyl) ether of a polyhydric alcohol.

7. The cured, infusible, insoluble product of the mixture of claim 2.

8. The cured, infusible, insoluble product of the mixture of claim 3.

9. The cured, infusible, insoluble product of the mixture of claim 4.

10. The cured, infusible, insoluble product of the mixture of claim 5.

11. The cured, infusible, insoluble product of the mixture of claim 6.

12. A curable mixture according to claim 1 in which X is a phenolic ether radical having a single phenolic hydroxyl group.

13. A curable mixture according to claim 1 in which

has the formula

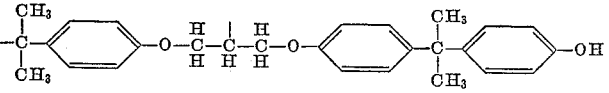

R is an isomeric phthaloyl radical and the polyepoxide is the reaction product of bis(4-hydroxyphenyl) dimethyl methane and an excess of epichlorohydrin.

14. The cured, infusible, insoluble product of the mixture of claim 12.

15. The cured, infusible, insoluble product of the mixture of claim 13.

16. The cured, infusible, insoluble product of the mixture of claim 1.

References Cited in the file of this patent

UNITED STATES PATENTS 2,592,560    Greenlee _____ Apr. 15, 1952
2,890,198    Breiner _____ June 9, 1959